(12) United States Patent
Anderson et al.

(10) Patent No.: US 6,426,844 B1
(45) Date of Patent: Jul. 30, 2002

(54) METHOD AND APPARATUS FOR PHASE MODULATED SERVO POSITIONING IN A DIRECT ACCESS STORAGE DEVICE

(75) Inventors: Todd Barry Anderson; Mark David Hagen, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1776 days.

(21) Appl. No.: 08/526,197

(22) Filed: Sep. 11, 1995

Related U.S. Application Data

(63) Continuation of application No. 08/125,959, filed on Sep. 23, 1993, now abandoned.

(51) Int. Cl.$^7$ ............................................. G11B 5/596
(52) U.S. Cl. ...................................... 360/77.08; 360/75
(58) Field of Search ..................... 360/77.11, 78.14, 360/79.09, 78.06, 78.08, 77.02, 77.04, 77.05, 75, 77.08

(56) References Cited

U.S. PATENT DOCUMENTS

| 4,549,232 A | 10/1985 | Axmear et al. |
| 5,055,951 A | 10/1991 | Behr |
| 5,119,248 A | 6/1992 | Bizjak et al. |
| 5,185,681 A | 2/1993 | Volz ........................ 360/77.04 |

FOREIGN PATENT DOCUMENTS

| JP | 56093119 | 7/1981 | |
| JP | 56145568 | 11/1981 | |
| JP | 0129708 | 1/1985 | .............. 360/77.07 |
| JP | 62175924 | 8/1987 | |
| JP | 6398820 | 4/1988 | |
| JP | 0220101 | 9/1989 | .............. 360/77.11 |
| JP | 4252415 | 9/1992 | |
| JP | 04307481 | 10/1992 | |
| JP | 5242435 | 5/1993 | |
| JP | 628322 | 1/1997 | |

OTHER PUBLICATIONS

IBM Tech. Disclossure Bulletin vol. 16, No. 6 Nov. 1973 by Schwarz pp. 1821–1823.

*Primary Examiner*—Aristotelis M. Psitos
(74) *Attorney, Agent, or Firm*—Joan Pennington; Richard E. Billion; Roy W. Truelson

(57) ABSTRACT

A phase modulated servo method and apparatus are provided for use in a disk file. The disk file includes at least one disk mounted for rotation about an axis and the disk has at least one disk surface for storing data. At a predefined location of the disk surface a series of servo tracks of a predetermined high gain servo pattern are written. The predetermined high gain servo pattern includes 360° phase difference information within each data cylinder. The servo tracks are detected for identifying servo phase information.

10 Claims, 3 Drawing Sheets

METHOD AND APPARATUS FOR PHASE MODULATED SERVO POSITIONING IN A DIRECT ACCESS STORAGE DEVICE

This application is a continuation of application Ser. No. 08/125,959 filed Sep. 23, 1993 now abandoned.

BACKGROUND OF THE INVENTION

1. Field of the Invention

The present invention relates generally to a phase modulated servo positioning system in a direct access storage device (DASD) and more particularly to a phase modulated servo method and apparatus for use with transducer heads having instabilities.

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

All DASD units must have a method to position each data head over the proper radial location to write a track and again, to position it very close to the same location to read the track. With the higher level files using a voice coil type of actuator, a feedback mechanism must be provided to locate and stably hold the head on a given track. Typically, track accessing and track following are provided utilizing a magnetically written pattern in the DASD unit. A dedicated servo system employs one surface of one of the disks in the DASD on which to have all the tracking and access information. A sector servo system uses small portions of tracks between each or between several sectors on each track of each data surface to provide the tracking and access information. A hybrid servo system uses both to obtain advantages of each type of servo.

Magneto-resistive (MR) heads are a great advancement in read/write technology for DASD; however, the MR head's worst characteristics is head instability. The term head instability is used to describe a number of readback waveform abnormalities. Although the exact cause of head instability is not known, the most popular model states that head instability is due to non-linear changes in the transfer curve of the MR element. These jumps may be due to non-linear changes in magnetic domain movement in the MR element. The jumps in the transfer curve cause corresponding jumps in the readback waveform. Most importantly, the non-linear features of the element transfer curve change each time the head is excited. The excitation typically is due to writing data, but can also be due to landing the MR head on the disk, hitting an asperity on the disk or changing MR bias current.

A problem exists to generate a position error signal (PES) from a phase modulated (PM) servo pattern in the presence of magnetic recording head instability. When instabilities are present in the readback signal, a PES generated from a phase modulated (PM) servo signal can result in a track misregistration (TMR) error.

SUMMARY OF THE INVENTION

It is a principal object of the present invention to provide a phase modulated servo method and apparatus for use with transducer heads having instabilities that overcomes many of the disadvantages of prior art arrangements.

In brief, the objects and advantages of the present invention are achieved by a phase modulated servo method and apparatus used in a disk file. The disk file includes at least one disk mounted for rotation about an axis and the disk has at least one disk surface for storing data. At a predefined location of the disk surface a plurality of servo tracks of a predetermined high gain servo pattern are written. The predetermined high gain servo pattern includes 360° phase difference information within each data cylinder. The servo tracks are detected for identifying servo phase information.

BRIEF DESCRIPTION OF THE DRAWING

The present invention, together with the above and other objects and advantages, can best be understood from the following detailed description of the embodiment of the invention illustrated in the drawing, wherein.

DETAILED DESCRIPTION OF THE PREFERRED EMBODIMENTS

Figure 1:
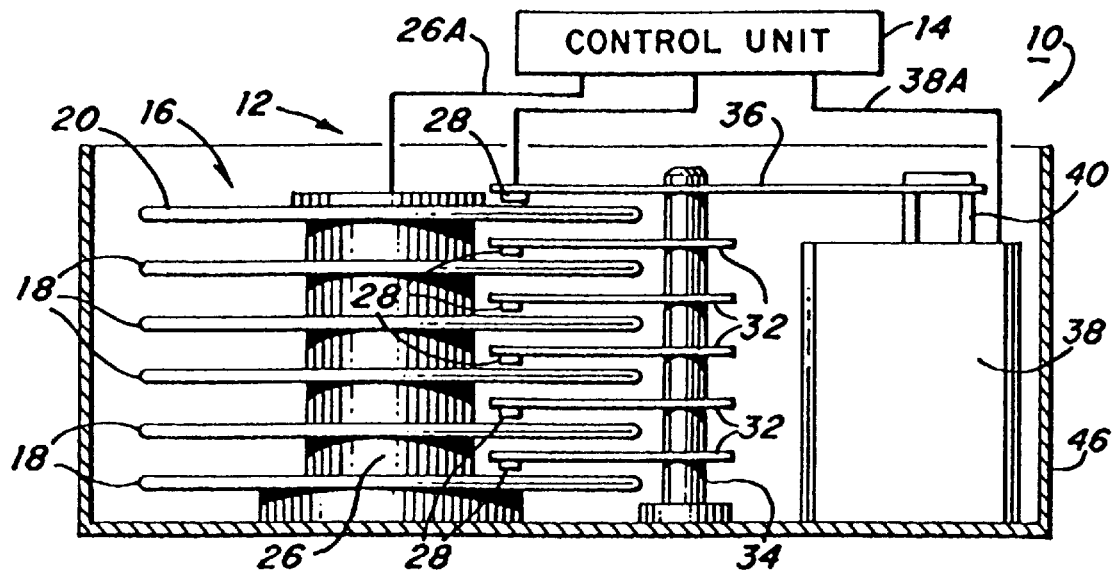
FIG. 1 is a schematic and block diagram of a data storage disk file embodying the present invention.

In FIG. 1 there is shown a partly schematic block diagram of parts of a data storage disk file 10 including a data storage medium generally designated as 12 and a control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Figure 2:
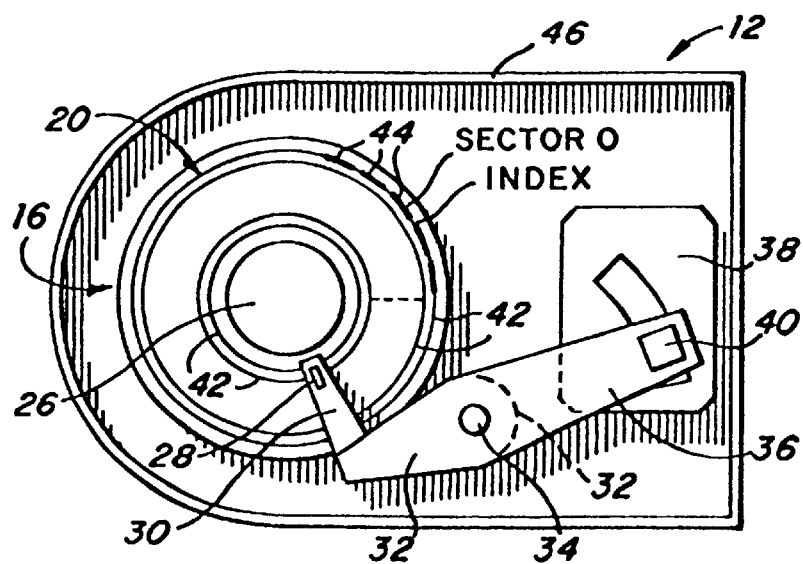
FIG. 2 is a diagram showing the accessing mechanism for a single disk surface of the apparatus of FIG. 1.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data information tracks or data cylinders 42 to be followed and access particular data sectors 44. Data storage disk file 10 is a modular unit including a housing 46. The various components of the disk file 10 are controlled in operation by signals generated by control unit 14 such as motor control signals on line 26A and position control signals on line 38A.

Numerous data information tracks 42 each at a specific radial location are arrayed in a concentric pattern in the magnetic medium of each disk surface 20 of data disks 18. A data cylinder includes a set of corresponding data information tracks 42 for the data surfaces 20 in the data storage disk file 10. Data information tracks 42 include a plurality of segments or data sectors 44, each containing a predefined size of individual groups of data records which are saved for later retrieval and updates. The data information tracks 42 are disposed at predetermined positions relative to a servo reference index. In FIG. 2 one sector 44 is illustrated as SECTOR 0 with a fixed index or mark INDEX for properly locating the first data sector. The location of each next sector 44 is identified by a sector identification (SID) pulse read by transducer heads 28 from surfaces 20.

Figure 3:
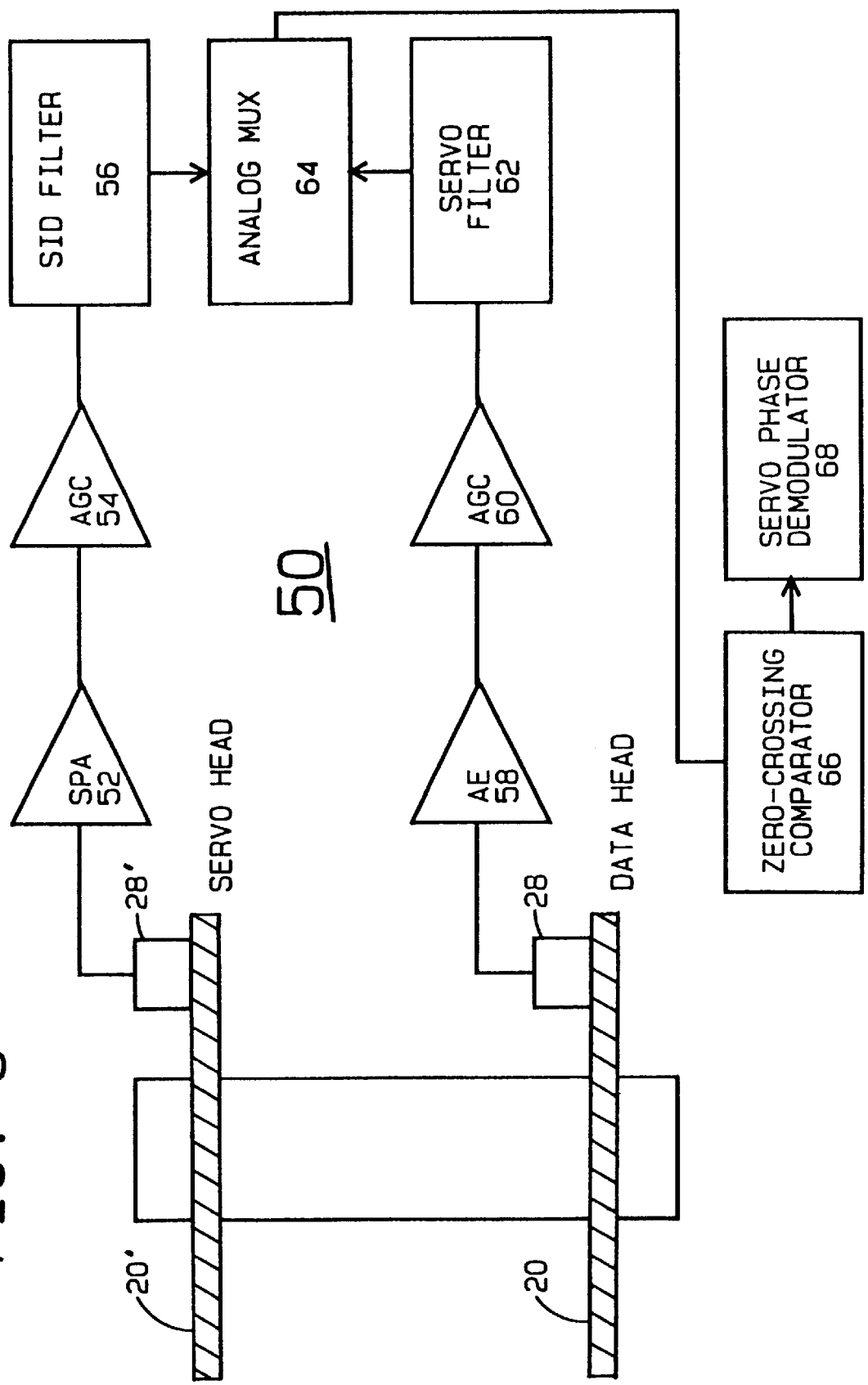
FIG. 3 is a block diagram representation illustrating apparatus for carrying out the servo demodulation method according to the present invention in the data storage disk file of FIG. 1.

Referring to FIG. 3, there is shown a circuit diagram illustrating phase modulated servo apparatus for carrying out the phase modulated servo method of the invention generally designated by the reference numeral 50.

In accordance with a feature of the phase modulated servo method of the invention, servo phase information is obtained from a high gain servo pattern that is robust to MR head instability. Utilizing the high gain servo pattern of the invention provides a modified waveform as compared to a conventional phase modulated servo pattern so that the baseline is minimized and the error due to head instability can also be minimized. Additionally, for a given radial displacement of the actuator the high gain servo pattern provides a larger phase change, so that phase errors due to instability represent smaller displacement errors.

In FIG. 3 apparatus 50 includes a servo channel including a dedicated servo surface 20' shown together with a dedicated servo transducer head 28' coupled to a servo preamplifier (SPA) 52, an automatic gain control (AGC) 54 and a servo identification (SID) filter 56. A data channel includes a data transducer head 28 disposed adjacent a data surface 20, arm electronics (AE) 58, an automatic gain control (AGC) 60 and a servo filter 62. The phase information stored in the servo patterns is derived by extracting a fundamental harmonic, such as 2.5 Mhz, from the readback signal by the high-pass SID filter 56 and servo filter 62. Signals from either the dedicated servo head 28' or servo patterns read by data transducer head 28, are multiplexed at an analog multiplexer block 64. A zero-crossing comparator detector 66 coupled to the multiplexer 64 detects the zero crossing in the readback signal. The output of the comparator 66 is supplied to a servo phase demodulator 68.

Comparator 66 applies a square wave signal to the servo phase demodulator 68 with precise phase transitions based on the zero crossings of the first harmonic signal. This square wave is then exclusive ORed or XORed with a 2.5 Mhz crystal oscillator and the transition differences between these two signals are integrated over a certain period by servo phase demodulator 68. The integrator value at the end of this period is proportional to the head offset relative to the track center line. This value is referred to as the position error signal (PES).

Figure 4:
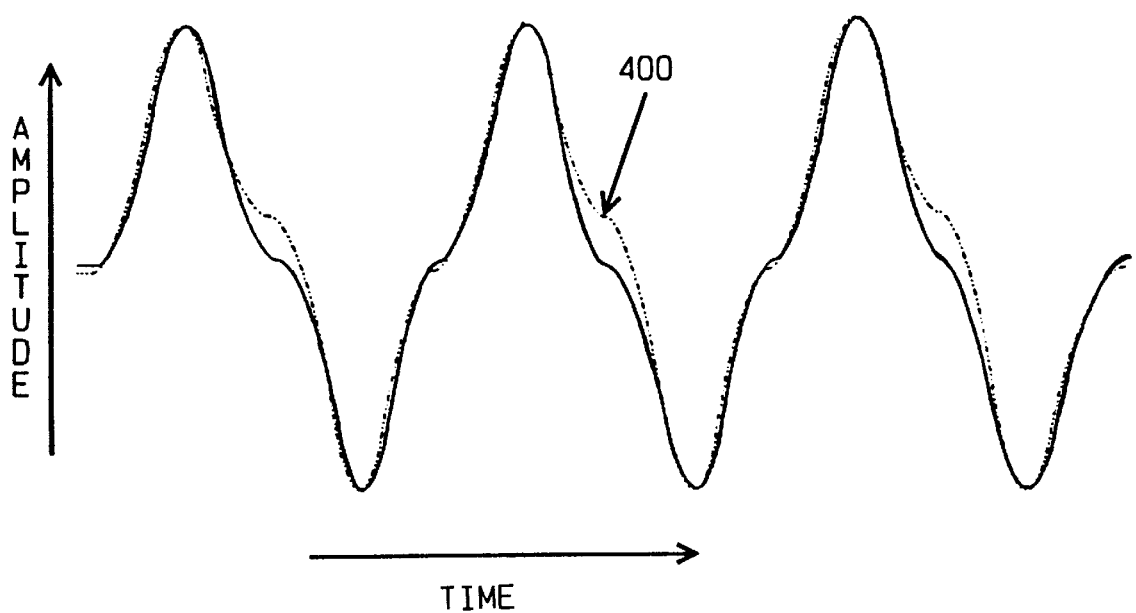
FIG. 4 is a chart illustrating a stable readback signal and a readback signal with instability shown in dotted line.

Referring to FIG. 4, there is shown a stable readback signal together with a readback signal with instability shown in dotted line. When the MR head 28 is used to read phase-modulated servo information, the most significant form of head instability is caused by non-linear jumps in the transfer curve of the MR element. These jumps can occur anywhere along the transfer curve, and hence, anywhere within the readback waveform. When the transfer curve jump causes a readback waveform baseline shift as indicated at 400, a phase error can result from the detected zero crossing by comparator 66 and therefore a position error. This causes track misregistration or TMR. When the non-linear jump in the transfer curve occurs in the peak of the readback waveform, there is little shift in phase of the signal.

Figure 5:
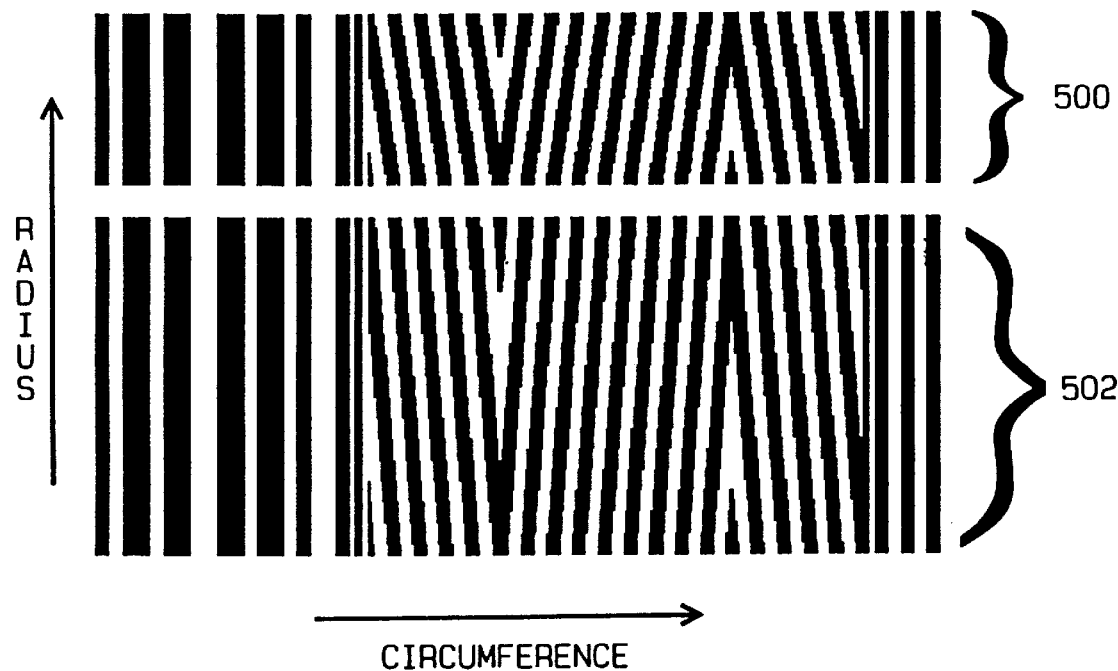
FIG. 5 is a chart illustrating a high gain servo pattern for reference tracks of the invention together with a standard gain servo pattern.

Referring to FIG. 5, a high gain servo pattern indicated by a bracket 500 and a standard gain servo pattern indicated by a bracket 502. In FIG. 5, the servo patterns 500 and 502 are shown with radius changes relative the vertical axis and circumferential changes relative the horizontal axis. High gain refers to the angle of the magnetic transitions in the servo burst. The angle is greater for the high gain pattern; and therefore the phase changes faster for a given radial displacement. FIG. 5 shows the burst pattern for both the standard phase pattern that repeats in four tracks and the high gain pattern of the invention that repeats in one track. Since the angle of the pattern is increased by a factor of four, the signal-to-noise for the servo channel is effectively improved by a factor of four. Since the high gain readback waveform does not flatten out at the baseline, the percent of time that the waveform that is at the baseline is reduced. This reduces the effect that jumps in the MR head transfer curve have on the detected phase of the readback waveform.

While FIG. 3 shows circuitry 50 with a dedicated servo architecture with reference tracks, it should be understood that the invention applies to sector servo architectures as well. The dedicated servo surface 20' consists of tracks written on ½ cylinder spacings so that there are two servo half tracks for each data cylinder. Position is encoded using the standard servo pattern 502 on the surface 20' by changing the phase with a 2.5 MHz burst by 22.5 degrees in each adjacent servo half track. There are 16 half tracks or 8 cylinders before the servo pattern 502 repeats. The dedicated surface includes three regions of outer guard band, data band and inner guard band.

Data surfaces 20 include a pair of reference tracks consisting of a series of servo tracks written in the inner and outer guard bands on each data surface. The reference tracks are similar to the dedicated servo pattern 502. The reference tracks are written on ¼ cylinder tracks. The OD reference tracks are written with the servo pattern 500 that runs through 360 degrees of phase on one cylinder. The ID reference tracks and the dedicated surface servo pattern 500 repeat in 4 cylinders or tracks.

For DASD 10, the linear bit density is typically twice as high at the inner disk radius as at the outer disk radius. This causes the readback waveform to have wide pulses at the ID and narrow pulses, resulting in a large percentage of baseline at the OD. With compensation reference tracks at both the disk OD and ID, the high gain pattern 500 is only needed at the outer radius. The inner radius reference tracks use the four-track type standard servo pattern 502 to determine both the correct position compensation for tracks near the ID and the course position compensation for the OD. Then the correct position compensation for tracks near the OD is calculated by first applying the compensation measured at the ID and then reading the high gain pattern 500 and determining the exact compensation required.

The readback waveform baseline is greatly reduced with the high gain pattern 500. This is due to the fact that the head 28 is normally reading three servo quarter tracks at a time. The readback waveform is the linear sum of the signal from each quarter track where the standard servo pattern 502 readback=0.5signal(0°)+signal (22.5°)+0.5signal(22.5°); and where the high gain pattern 500 readback=0.5signal(0°)+signal(45°)+0.5signal(90°).

While the invention has been described with reference to details of the illustrated embodiments, these details are not intended to limit the scope of the invention as defined in the appended claims.

What is claimed and desired to be secured by Letters Patent of the United States is:

1. Apparatus for demodulating a phase modulated servo signal in a disk file, said servo signal having a baseline, said apparatus comprising:

at least one disk mounted for rotation about an axis and having at least one disk surface for storing data;

means for writing at a predefined location of said disk surface a series of servo tracks of a predetermined high gain servo pattern, said high gain servo pattern producing a readback signal where the baseline is minimized; said predetermined high gain servo pattern including 3600 phase difference information within each servo track; said predetermined high gain servo pattern providing said readback signal having a predetermined high phase change for a predetermined radial displacement and said readback signal being at the baseline a predetermined small percent of time, whereby said readback signal does not flatten out at the baseline;

means for detecting said servo tracks for identifying servo phase information; and means for demodulating a phase modulated servo signal.

2. Apparatus for demodulating a phase modulated servo signal as recited in claim 1 wherein said means for writing at said predefined location of said disk surface said series of servo tracks of said predetermined high gain servo pattern include means for writing said series of servo tracks on ¼ data cylinder spacing and in an outer guard band of said disk surface.

3. Apparatus for demodulating a phase modulated servo signal as recited in claim 1 wherein said means for writing and for detecting said reference track includes a magneto-resistive (MR) transducer head.

4. Apparatus for demodulating a phase modulated servo signal as recited in claim 1 wherein said means for detecting said servo tracks for identifying servo phase information includes transducer means for generating said readback signal from said disk surface; filter means coupled to said transducer means for generating a first harmonic readback signal; zero-crossing comparator means coupled to said filter means for identifying zero-crossings of said first harmonic readback signal.

5. Apparatus for demodulating a phase modulated servo signal as recited in claim 1 wherein said means for writing at said predefined location of said disk surface said series of servo tracks of said predetermined high gain servo pattern includes means for writing two signals of the same frequency having a predetermined phase difference between adjacent servo tracks.

6. Apparatus for demodulating a phase modulated servo signal as recited in claim 5 wherein said predetermined phase difference between adjacent servo tracks is 45°.

7. A phase modulated servo method used in a disk file including at least one disk mounted for rotation about an axis and having at least one disk surface for storing data, said method comprising the steps of:

writing at a predefined location of said disk surface a series of servo tracks of a predetermined high gain servo pattern, said servo pattern producing a readback signal having a base line where the baseline is minimized; and said predetermined high gain servo pattern including 360° phase difference information within each servo track; said predetermined high gain servo pattern providing said readback signal having a predetermined high phase change for a predetermined radial displacement and said readback signal being at the baseline a predetermined small percent of time, whereby said readback signal does not flatten out at the baseline;

detecting said servo tracks for identifying servo phase information; and demodulating a phase servo signal.

8. A phase modulated servo method as recited in claim 7 wherein said writing step includes the steps of:

writing said series of servo tracks on ¼ data cylinder spacing and in an outer guard band of said disk surface.

9. A phase modulated servo method as recited in claim 7 wherein said disk file includes a dedicated servo surface containing a plurality of servo tracks of standard gain servo pattern and wherein said series of servo tracks is written in an outer guard band of said disk surface and further includes the step of: writing at an inner guard band of said disk surface a series of servo tracks of said standard gain servo pattern.

10. (Three times amended) A direct access storage device comprising:

a housing;

at least one disk mounted in said housing for rotation about an axis and having at least one disk surface for storing data;

transducer means mounted for movement across said disk surface for reading and writing data and predefined types of servo identification patterns to said disk surface;

means for writing at a predefined location of said disk surface a series of servo tracks of a predetermined high gain servo pattern, said servo pattern producing a readback signal having a baseline where the baseline is minimized; and said predetermined high gain servo pattern including 360° phase difference information within each servo track; said predetermined high gain servo pattern providing said readback signal having a predetermined high phase change for a predetermined radial displacement and said readback signal being at the baseline a predetermined small percent of time, whereby said readback signal does not flatten out at the baseline;

means for detecting said servo tracks for identifying servo phase information; and means for demodulating a phase servo signal.

* * * * *

UNITED STATES PATENT AND TRADEMARK OFFICE
CERTIFICATE OF CORRECTION

PATENT NO.    : 6,426,844 B1                                            Page 1 of 1
DATED         : July 30, 2002
INVENTOR(S)   : Todd Barry Anderson et al.

It is certified that error appears in the above-identified patent and that said Letters Patent is hereby corrected as shown below:

Column 5,
Line 17, "3600" should be -- 360º --,

Column 6,
Line 31, delete "(Three times amended)".

Signed and Sealed this

Seventeenth Day of December, 2002

JAMES E. ROGAN
*Director of the United States Patent and Trademark Office*